Oct. 18, 1938.  P. S. RIEL  2,133,927
SNOW DIVERTING MEANS FOR AUTOMOBILE WINDSHIELDS AND THE LIKE
Filed June 22, 1936
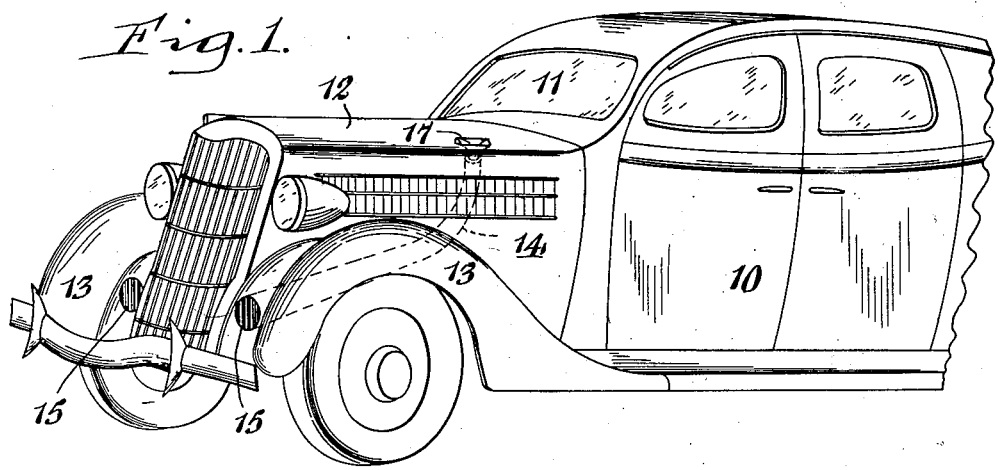
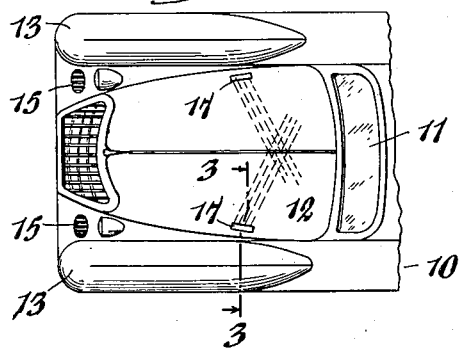
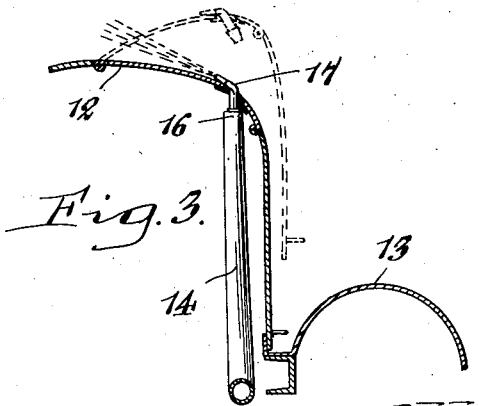
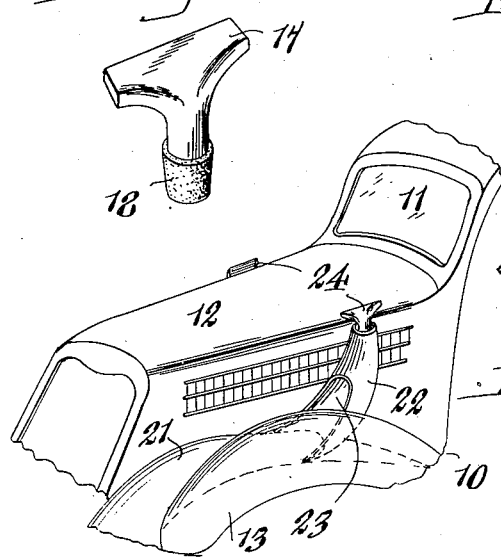
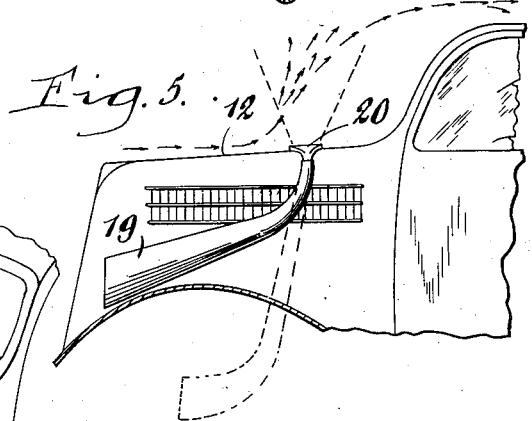
Inventor
Peter S. Riel,
by Walter P. Geyer
Attorney Patented Oct. 18, 1938

2,133,927

UNITED STATES PATENT OFFICE 2,133,927

SNOW DIVERTING MEANS FOR AUTOMOBILE WINDSHIELDS AND THE LIKE

Peter S. Riel, Buffalo, N. Y.

Application June 22, 1936, Serial No. 86,440

6 Claims. (Cl. 296—91)

This invention relates generally to a method and means for maintaining the windshields of automobiles and like vehicles free of snow and other particles in the atmosphere as the vehicle is traveling along the highway.

The principle object of the invention is the provision of simple and inexpensive, yet effective means, for deflecting or diverting snow and like elements or particles upwardly and in a plane forwardly of the windshield so that as the car travels along the road, the snow will not contact or lodge upon the windshield but will be directed in a sheet or stream over the top of the vehicle, leaving the windshield clean and assuring a clear vision to the driver.

A further object is to provide a method and means for preventing the striking or impinging of snow and like particles against the windshield through the medium of a constant air pressure directed against the snow-filled air at a point forwardly of the windshield and thereby provide an air impedance wall which acts to direct the snow upwardly out of the plane of travel of the windshield.

Other features of the invention reside in the construction and arrangement of parts hereinafter described and particularly pointed out in the appended claims.

In the accompanying drawing:

Figure 1 is a fragmentary perspective view of an automobile equipped with my invention. Figure 2 is a fragmentary top plan view of the front end of the vehicle showing the manner in which the air is directed forwardly of the windshield. Figure 3 is an enlarged fragmentary cross section taken substantially in the plane of line 3—3, Figure 2. Figure 4 is a detached perspective view of one of the air injecting nozzles. Figure 5 is a fragmentary side elevation of an automobile showing a slightly modified form of my snow deflecting means. Figure 6 is a fragmentary perspective view of a front end of an automobile showing another modification of the invention.

Similar characters of reference indicate corresponding parts throughout the several views.

Referring now to the drawing, 10 indicates the body of an automobile, 11 the windshield thereof, 12 the usual hood composed of hinged sections to permit it to be readily opened and closed, and 13 the front fenders.

In carrying out my invention to keep the windshield clean and free from snow and like particles in the atmosphere while the vehicle is in motion, I utilize air pressure directed and focused on a point forwardly of the windshield to hurl the snow upwardly and in effect provide an air impedance wall or stream which functions to deflect or divert the snow or like particles upwardly where they cannot impinge against and are out of the plane of travel of the windshield and are thence directed by the air currents over the top of the car. In the preferred form of the invention shown in Figures 1–4, inclusive, the air pressure utilized for the purpose described is directed during the motion of the car into air conduits or ducts 14 which may be substantially funnel-shaped, and which extend generally lengthwise of the car and, as shown in Figure 1, are disposed at opposite sides of the front end of the car. As shown in Figures 1 and 2, these conduits are open at their front ends which may be provided with grilling or screening 15 built into the adjoining portions of the vehicle body or fenders 13. These conduits extend rearwardly beneath the fenders or car-body and thence upwardly within the hood 12, as seen in Figure 3, and preferably converge gradually from their front to their rear ends. Communicating with the discharge ends 16 of the conduits 14, are nozzles 17 which are disposed forwardly of and substantially in line with the opposite sides of the windshield, as shown in Figure 2, and which are preferably carried by the top portion of the sectional hood so as to move therewith during the opening and closing movements thereof and therefore will not interfere with convenient access to the motor. To this end, the lower or inlet end of each nozzle is provided with a leak-proof connection or sleeve-like fitting 18 which forms an airtight joint with the upper end of the corresponding conduit 14, whereby when the hood is closed the nozzle connection 18 automatically registers and provides an air-tight joint with the discharge end of the conduit. As shown in Figures 3 and 4, the air injection nozzles 17 are so shaped as to direct the blasts of air not only in opposite directions transversely of the vehicle immediately above the hood, but rearwardly and upwardly as well, so that the two streams of air emitted from these nozzles converge and cross each other in the manner shown by dotted lines in Figure 2 to produce an air impedance wall which directs and hurls the intercepted snow and other particles upwardly over the top and at opposite sides of the car at a point forwardly of the windshield to keep the windshield clean and assure a clear vision for the driver.

In the modified form of the invention shown in Figure 5, the air conduits 19 are disposed on opposite sides of the hood and are in the form of separate fittings or connections which may be applied externally of the hood, with their inlets disposed above the fenders and with the nozzles 20 disposed in overlying relation to the hood. If desired, these conduits may be disposed as shown by dotted lines in Figure 5, wherein the inlets extend below the fenders.

In the form of the invention shown in Figure 6, the channel-way 21 formed between the hood and front fenders of the vehicle is utilized and functions to direct the air, when the car is in motion, into a conduit 22 rising from a point substantially midway of the length of the hood and having its front side partially open, as indicated at 23, and terminating at its discharge end in nozzles 24.

I claim as my invention:—

1. The method of maintaining windshields and the like free of snow and other elements while the vehicle is in motion, which consists in directing, from opposite sides of the vehicle, opposing streams of air generally crosswise and upwardly in a plane forwardly of the windshield to thereby intercept the elements and divert them upwardly clear of the path of the windshield.

2. The method of maintaining windshields and the like free of snow and other elements while the vehicle is in motion, which consists in directing, from opposite sides of the vehicle, converging streams of air in opposite directions and upwardly and rearwardly in a plane forwardly of the windshield to thereby intercept the elements and divert them upwardly clear of the path of the windshield.

3. In an automobile, a body having a hood and a windshield, and conduit-like means applied to the opposite sides of the front of said body adjacent the hood and opening at one end in the direction of travel of the automobile to receive air and opening at their opposite ends immediately over the hood in advance of the windshield for ejecting converging streams of air in a direction generally upward to intercept and divert the elements clear of the path of travel of the windshield.

4. Means for maintaining the windshields of automobiles and like vehicles free of snow and other elements while the vehicle is in motion, comprising air conduits applied to the vehicle and having an inlet and a discharge, the inlet of each conduit opening in the direction of travel of the vehicle and the discharge ends of said conduits being disposed at opposite sides of the vehicle and terminating forwardly of the windshield in opposing nozzles for injecting converging streams of air upwardly to intercept and divert the elements clear of the path of travel of the windshield.

5. Means for maintaining the windshields of automobiles and like vehicles free of snow and other elements while the vehicle is in motion, comprising air conduits applied to the vehicle and having an inlet and a discharge, the inlet of each conduit opening in the direction of travel of the vehicle and the discharge ends of said conduits terminating forwardly and adjacent opposite sides of the windshield in nozzles disposed to direct converging streams of air in opposite directions crosswise of the vehicle immediately above the vehicle-hood and rearwardly and upwardly to provide an air impedance wall and to intercept and divert the elements clear of the path of travel of the windshield.

6. In an automobile, a body having a hood and a windshield, and conduit-like means applied to the front of said body adjacent the hood and opening at one end in the direction of travel of the automobile to receive air, the opposite ends of said conduit-like means opening beneath and adjacent opposite sides of the hood, and nozzles applied to the hood forwardly of and substantially in line with the opposite sides of the windshield and having detachable air-tight connections to the opposing ends of said means, respectively, said nozzles being disposed to eject streams of air in a direction to divert the elements clear of the path of travel of the windshield.

PETER S. RIEL.